United States Patent [19]
Kaneko et al.

[11] Patent Number: 5,184,254
[45] Date of Patent: Feb. 2, 1993

[54] PLAYBACK APPARATUS FOR PLAYING BACK VIDEO INFORMATION RECORDED ON MAGNETIC TAPE AND PROVIDING SMOOTH-FRAME STILL OR SLOW MOTION VIDEO

[75] Inventors: Masahiro Kaneko; Masashi Takemura; Kohei Yamashita, all of Yokohama, Japan

[73] Assignee: Victor Company of Japan, Ltd., Yokohama, Japan

[21] Appl. No.: 511,786

[22] Filed: Apr. 20, 1990

[30] Foreign Application Priority Data

Apr. 21, 1989 [JP] Japan ................................. 1-100116

[51] Int. Cl.$^5$ ...................... H04N 5/783; G11B 5/592
[52] U.S. Cl. .................................. 360/10.2; 360/10.3; 360/77.16
[58] Field of Search ..................... 360/10.2, 10.3, 77.16

[56] References Cited
U.S. PATENT DOCUMENTS

4,935,827 6/1990 Oldershaw et al. ............ 360/10.2 X
4,991,031 2/1991 Takayam et al. ................... 360/10.2

Primary Examiner—Joseph L. Dixon
Assistant Examiner—David L. Robertson
Attorney, Agent, or Firm—Jacobson, Price, Holman & Stern

[57] ABSTRACT

There is disclosed an improvement in an apparatus of the helical scan type for playing back of information signals prerecorded on a magnetic tape along tracks inclined with respect to a running direction of a magnetic tape in a manner that tracks of common azimuth angle are formed every other track. The apparatus is characterized in that first and second head assemblies each comprise a pair of heads having azimuth angles different from each other and disposed adjacent to each other, are arranged displaceably in a direction vertical to a track scanning direction, respectively, and are displaced by a displacement element, the heads in the first head assembly respectively have azimuth angles common to azimuth angles of the heads in the second head assembly in such a manner that two common azimuth heads are angularly separated each other by 180 degrees on a rotary drum carrying the first and second head assemblies; and that when a recorded image signal on the magnetic tape is played back with the magnetic tape being wound onto the rotary drum over a predetermined angular range, the displacement element displacing the first and second head assemblies in accordance with a selected tape speed mode, causing each of the heads in the first and second head assemblies tracking to scan the tracks having azimuth angles common to azimuth angles of the heads.

4 Claims, 11 Drawing Sheets

PLAYBACK APPARATUS FOR PLAYING BACK VIDEO INFORMATION RECORDED ON MAGNETIC TAPE AND PROVIDING SMOOTH-FRAME STILL OR SLOW MOTION VIDEO

BACKGROUND OF THE INVENTION

The present invention relates to a playback apparatus for magnetic tape recording information, and more particularly, to a playback apparatus for playing back or reproducing a recorded image signal of a magnetic tape where image signals are recorded on tracks inclined with respect to a longitudinal direction of a magnetic tape in the manner that tracks having the same azimuth angle are formed every other track.

Hitherto, there have been proposed Video Tape Recorders (VTR) of the inclined azimuth recording system (helical scan type) where image signals are recorded on tracks inclined (inclined tracks) with respect to a longitudinal direction of a magnetic tape wound around the circumference of a rotary drum over a predetermined angular range with the magnetic tape being in contact therewith by means of a pair of rotary heads having azimuth angles different from each other affixed or mounted on the rotary drum in the manner that tracks having the same azimuth angle are formed every other track, and that each track is allowed to serve as a signal recording area corresponding to one field.

Figure 1:
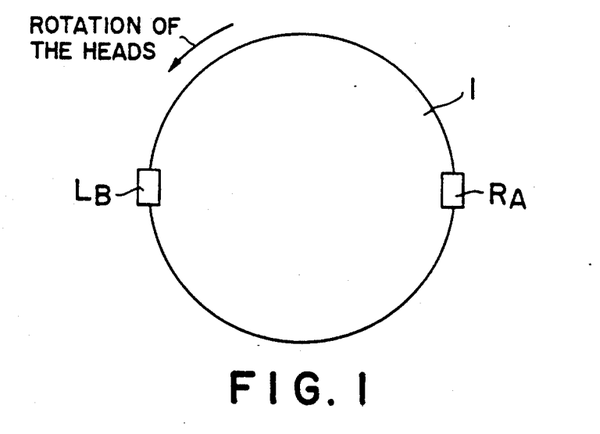
FIG. 1 is a schematic view showing a head arrangement of a VTR of the inclined azimuth recording system.

In such a VTR, as shown in FIG. 1, a pair of rotary heads $R_A$ and $L_B$ having azimuth angles different from each other, are arranged and affixed on a rotary drum 1 in the manner that they are positioned opposite to each other with an angular distance of 180 degrees therebetween. Reference symbols A and B represent the symbols of azimuth, respectively, and show that the azimuth angles of oppsite heads are different from each other.

Figure 2:
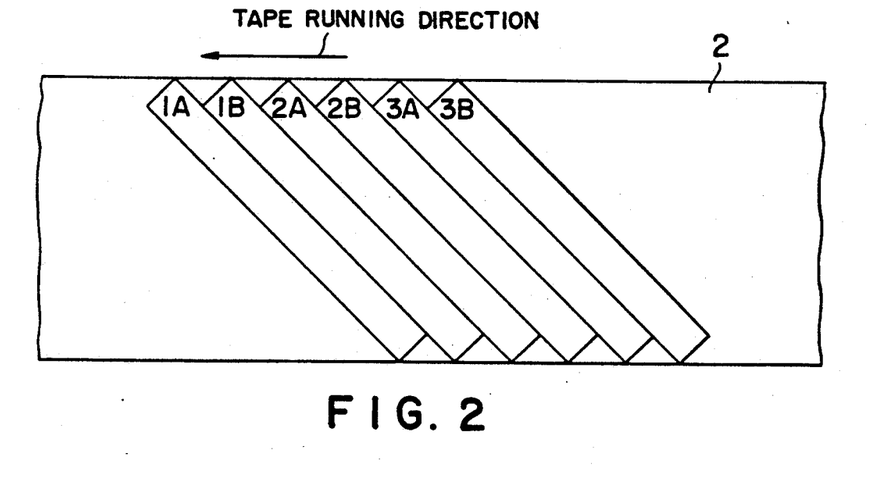
FIG. 2 is a schematic view showing tracks on a magnetic tape recorded by the VTR.

As shown in FIG. 2, the above-mentioned inclined tracks 1A, 1B, 2A, 2B, 3A, 3B, and the like are formed on a magnetic tape 2 recorded by the above-described VTR in the manner that tracks having the same azimuth angle described above are in line.

In FIG. 2, numbers 1, 2 and 3 and reference symbols A and B attached to the tracks represent frame numbers and symbols of azimuth, respectively.

The operation in the special playback, e.g., still picture playback or slow motion playback etc. of the image signals recorded on a magnetic tape in the manner that tracks having the same azimuth angle are formed every other track inclined with respect to the longitudinal direction of the magnetic tape in the manner stated above, will now be described.

Generally, when frame playback is conducted by the still picture playback of an object moving at a high-speed, an image vibration might take place due to time differences between fields. For this reason, field playback is carried out in the case of the special playback. Heads having the same azimuth angle are required in order to conduct the field playback. However, since inclined tracks having the same azimuth angle are positioned every other track as described above, and the number of tracks which can be played back by this head is reduced to one half of the entire number of tracks.

FIRST PRIOR ART

As an example of a conventional magnetic playback apparatus for the playing back or reproducing of recorded image signals by inclined tracks on the above-mentioned magnetic tape, there is proposed a magnetic playback apparatus based on the automatic tracking control system adapted to arrange a head so that the head is shifted or moved in a track width direction by a head displacement means, e.g., piezoelectric bimorph, moving coil, laminated piezoelectric element, or linear motor, etc. to shift or move the head in a direction perpendicular to the track scanning direction (i.e., track width direction) in order to correctly scan (trace) the head on recording tracks at the time of the above-mentioned special playback to drive the head displacement means to thereby control a track scanning displacement (tracking) of the head.

Figure 3:
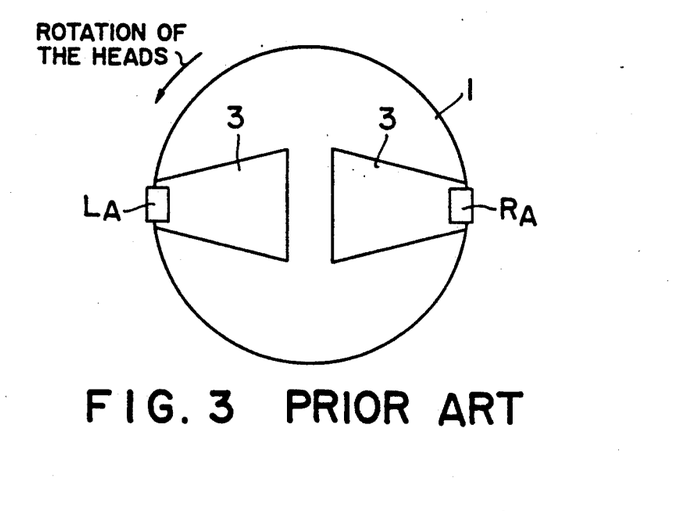
FIG. 3 is a schematic view showing a head arrangement in an example of a conventional playback apparatus.

In the case of attempting to carry out the aforementioned playback by an automatic tracking control system, as shown in FIG. 3, an approach is employed to arrange a pair of rotary heads $R_A$ and $L_A$ having an azimuth angle (A azimuth) so that they are shifted or moved in a track width direction by head displacement means, respectively, to dispose and affix then at positions oppsite each other with an azimuth distance of 180 degrees therebetween on a rotary drum 1 to wind a magnetic tape on the circumference of the rotary drum 1, e.g., over an angular range of a little more than 180 degrees in the manner of being in contact therewith to conduct a playback, and therefore deliver playback signals separately from the respective two heads to the VTR body.

In the case of conducting, e.g., ½ speed playback as the aforementioned playback, during one revolution of the rotary drum, the magnetic tape advances by a distance corresponding to one track (in this connection, in the case of an ordinary playback, the magnetic tape advances by a distance corresponding to two tracks). Accordingly, the rotary heads $R_A$ and $L_A$ trace one track. Since the magnetic tape advances at a constant speed during this time period, respective heads are shifted or moved in a track width direction by the automatic tracking control thereby allowing the heads to correctly conduct tracing so that the heads are in contact with the recording tracks.

Playback signals from rotary heads $R_A$ and $L_A$ become image signals of one field, respectively. By these image signals, an image signal of one frame is synthesized. When tracing by respective heads of the track IA is completed, the magnetic tape advances to the position of the track IB. Since this track IB has an azimuth angle different from those of rotary heads $R_A$ and $L_A$, displacement in a track width direction is carried out by the automatic tracking control so that the rotary heads $R_A$ and $L_A$ trace the track 1A once again.

At the next time, since the magnetic tape advances to the position of the track 2A, the rotary heads $R_A$ and $L_A$ are returned to the respective original positions. Then, the track 2A is traced twice by respective heads in a manner similar to tracing of the track 1A.

In this way, respective heads trace twice, only the tracks on the A side one after another in the order of tracks 3A, 4A, and the like and carry out a signal playback of respective tracks. Namely, playback is conducted in the order of the tracks 1A, 1A, 1A, 1A, 2A, 2A, 2A, 2A, 3A, 3A, 3A, 3A and the like.

By the above operation, at the time of a low-speed special playback (slow motion playback), the same tracks are traced several times depending upon the low-speed, and are played back or reproduced.

Moreover, at the time of high-speed special playback (quick motion playback), tracking is conducted for every other track depending upon the high-speed and are played back or reproduced.

Furthermore, at the time of a reverse playback, that is substantially the same as that of the ordinary playback except that tracks are traced in the order opposite to that of the ordinary playback.

Still furthermore, at the time of still playback, only the nearest tracks on the A side are continuously traced and played back or reproduced.

It is to be noted that a playback operation similar to the above is conducted in the case of tracing only those tracks on the B side by a pair of rotary heads $R_B$ and $L_B$ having the same azimuth angle (B azimuth) to play them back. For example, in the case of a ½ speed playback, respective heads trace twice only tracks on the B side in the order of 1B, 1B, 1B, 1B, 2B 2B, 2B, 2B, 3B,3B, 3B, 3B and so on, and play them back.

Figure 4:
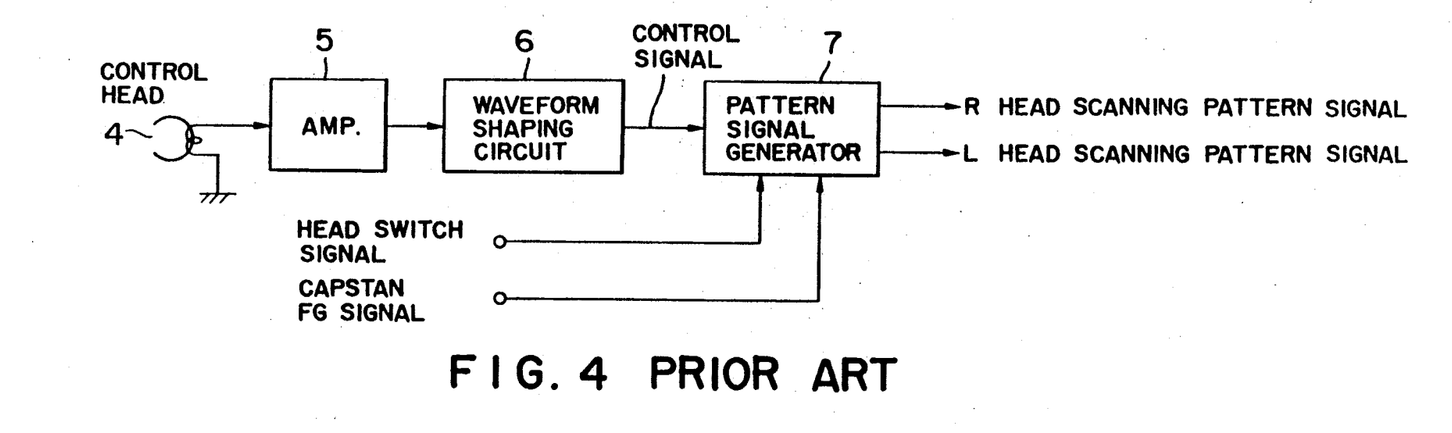
FIG. 4 is a block diagram showing a circuit for tracking control of the head in the conventional apparatus.

FIG. 4 is a block diagram showing the circuit configuration for tracking control of the head in the abovementioned magnetic playback apparatus.

In FIG. 4, a signal which is conventionally recorded along an edge of the tape and is played back or reproduced by the control head 4 is amplified through an amplifier 5 and a waveform shaping circuit 6, and is subjected to waveform shaping. The signal thus obtained is delivered to a pattern signal generator 7 as a control signal (CTL). On the other hand, a head switching signal and a capstan FG signal which are switched every field are delivered to the pattern signal generator 7.

The pattern signal generator 7 generates an R head scanning pattern signal and L head delivered as a drive signal to the head displacement means 3 in order to control the track scanning displacement (tracking) of the rotary heads $R_A$ and $L_A$ on the basis of the control signal, the head switching signal and capstan FG signal which are delivered to the pattern signal generator 7.

Figure 6:
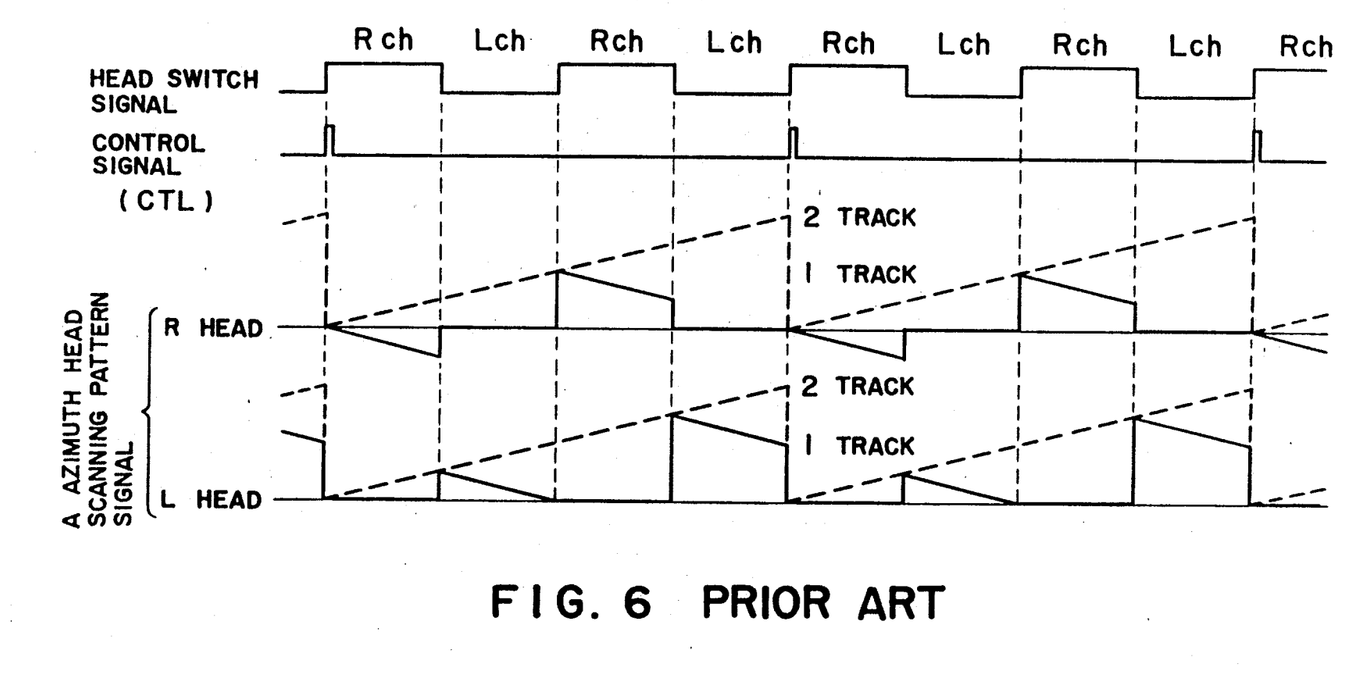
FIG. 6 is a waveform diagram for explaining the operation of the conventional apparatus.

FIG. 6 is a diagrammatic view showing respective signals in the case of conducting a ½ speed playback. In this case, there are shown an R head scanning pattern signal and an L head scanning pattern signal for the head of A azimuth, and the control signal has a period of two frames. Furthermore, in the figure, the sawtooth waveform indicated by the broken line represents a relative positional displacement between tracks and heads by the running of the magnetic tape.

Figure 5:
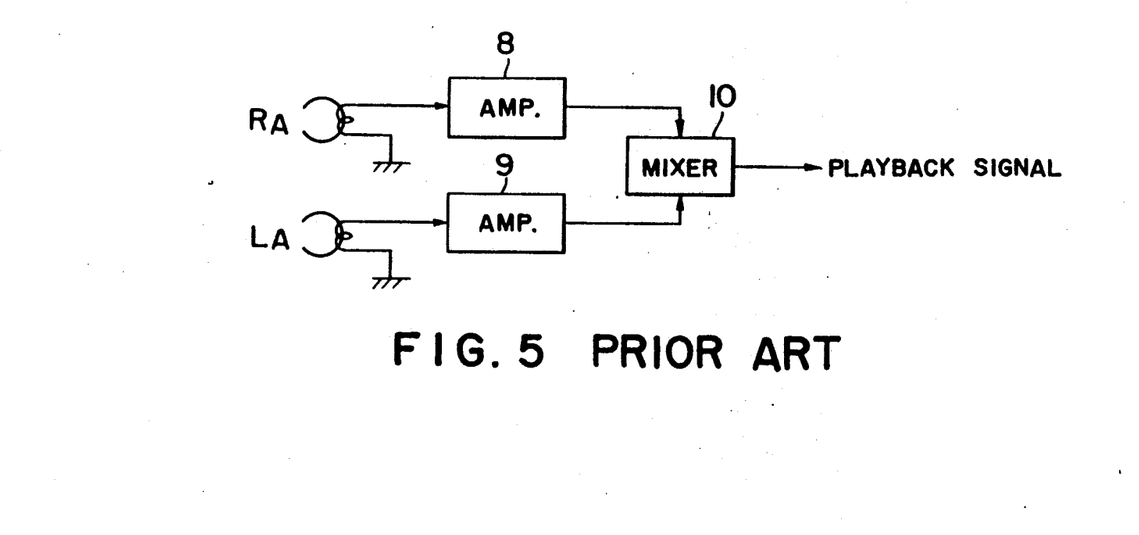
FIG. 5 is a block diagram showing a circuit of the head section in the conventional apparatus.

Furthermore, signals played back by the rotary heads $R_A$ and $L_A$ are amplified, as shown in FIG. 5, at amplifiers 8 and 9, respectively. These signals are synthesized at the mixer 10. Therefore, the synthesized signal is outputted as a played back or reproduced signal.

SECOND PRIOR ART

As another example of conventional magnetic playback apparatus, there is proposed an apparatus provided with a so called double azimuth head which does not include the head displacement means as stated above and is composed of a pair of heads having azimuth angles different from each other and disposed adjacent to each other, wherein one of the pair of heads is constructed as a broad head for the exclusive use of playback of the standard recording tracks and the other is constructed as a narrow head for exclusive use for playback of the extended play recording track.

In the case of conducting the aforementioned special playback by the double azimuth head, when a magnetic tape runs at a low-speed in the ½ speed playback, the head cannot trace and play back the entire width of tracks having the same azimuth angle (since there is no head displacement means, the head is not shifted or moved in a track width direction). For this reason, at the time point when a playback signal level of the head drops to a certain degree, switching is made to a playback output of a head having an inverse azimuth angle substantially at the same position, which is disposed adjacent thereto. At this time, the magnetic tape is in the state of an intermittent feed. Thus, playback is conducted in the order of tracks 1A, 1B, 1A, 1B, 2A, 2B, 2A, 2B, 3A, 3B, 3A, 3B, and so on.

However, in the former case (the first prior art) of the aforementioned magnetic playback apparatus, since playback is conducted every other track, e.g., in the ½ speed playback, there occurs the inconvenience that a reconstructed frame is brought into a frame feed state, so moving pictures in particular appear awkward. In the case of other low speed playback apparatus, playback is conducted for every certain number of tracks in the same manner as stated above, resulting in the aforementioned inconvenience.

On the other hand, in the latter magnetic playback apparatus (the second prior art), there is no possibility that playback is conducted every other track. However, since the magnetic tape is in an intermittent feed state at the time of a low speed playback, "fluctuation" occurs in the reconstructed frame, resulting in an unseemly frame. Furthermore, a head is switched during feeding of the tape between the still playback frame by the intermittent feeding, in the inconvenience that discontinuity points appear in a frame.

SUMMARY OF THE INVENTION

An object of the present invention is to provide a magnetic playback apparatus which has solved the aforementioned problems with the prior art, and which can provide a smooth frame at the time of slow motion playback or still playback.

To achieve the aforementioned object, the present invention provides a magnetic playback apparatus for playing back or reproducing a recorded image signal of a magnetic tape along tracks inclined with respect to a longitudinal direction of a magnetic tape in the manner that tracks of common azimuth angle every other track are formed, characterized in that first and second head assemblies each comprising a pair of heads having azimuth angles different from each other, are arranged displaceably in a direction vertical to a track scanning direction, respectively, and are displaced by displacement means, the heads in the first head assembly respectively have azimuth angles common to azimuth angles of the heads in the second head assembly in such a manner that two common azimuth heads are angularly separated from each other by 180 degrees on a rotary drum carrying the first and second head assemblies; and that when a recorded image signal on the magnetic tape is played back with the magnetic tape being wound onto the rotary drum over a predetermined angular range, the displacement means displacing the first and second head assemblies in accordance with a selected tape speed mode, causing each of the heads in the first and second head assemblies tracking to scan the tracks having azimuth angles common to azimuth angles of the heads.

As stated above, in accordance with the magnetic playback apparatus of the present invention, because heads scan the entire tracks on a magnetic tape and play them back, even in the case of a picture moving at a fast speed, a reconstructed frame which is not unseemly, i.e., smooth, is provided at the time of a special playback such as a slow motion playback. Especially, in the case of still playback, it is possible to seek a still reconstructed frame of reproduced pictures obtained by scanning the entire tracks. Accordingly, the scope of selection of an image is widened, thereby making it possible to select a suitable still reconstructed frame. Thus, the problems with the prior art can be advantageously solved.

DETAILED DESCRIPTION OF THE PREFERRED EMBODIMENTS

There will be embodiments according to the present invention with reference to the accompanying drawings. In the figures in the following description, the same reference numerals are attached to the same components as those in the above-referenced figures, respectively.

This invention is directed to a magnetic playback apparatus for playing back a recorded image signal of a magnetic tape recorded image signal on which inclined tracks 1A, 1B, 2A, 2B, 3A, 3B, and so on are recorded in the manner that tracks having same azimuth angles are formed every other track, as shown in FIG. 2, by a VTR of the inclined azimuth recording system.

Figure 7:
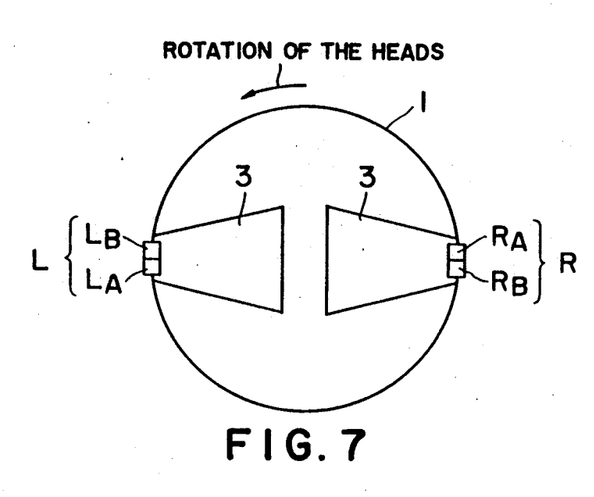
FIG. 7 is a plan view showing a head arrangement in a playback apparatus according to a first embodiment of the present invention.

As shown in FIG. 7, a pair of heads $R_A$ and $R_B$ (a head assembly R) having azimuth angles different from each other and disposed adjacent to each other and a pair of heads $L_A$ and $L_B$ (a head assembly L) having azimuth angles different from each other and disposed adjacent each other in the manner similar to the above head assembly are arranged so that they are shifted in a track width direction by head displacement devices 3 and 3, respectively, and the pairs are arranged and affixed at positions opposite to each other with an angular distance of 180 degrees therebetween on the rotary drum 1. In this case, heads having the same azimuth angle are arranged so that they are located at positions opposite to each other with respect to the center of the rotary drum 1 i.e., with an angular distance of 180 degrees therebetween on the rotary drum Heads are arranged so that they trace tracks with the heads in the order of the heads $R_A$, $R_B$, $L_A$ and $L_B$. For example, a playback is conducted with the magnetic tape wound onto the circumference of the rotary drum 1 over an angular range of a little more than 180 degrees. Thus, playback signals from four heads are separately delivered to the circuitry in the VTR body. Furthermore, changeover switches for switching respective playback signals are provided.

Figure 8:
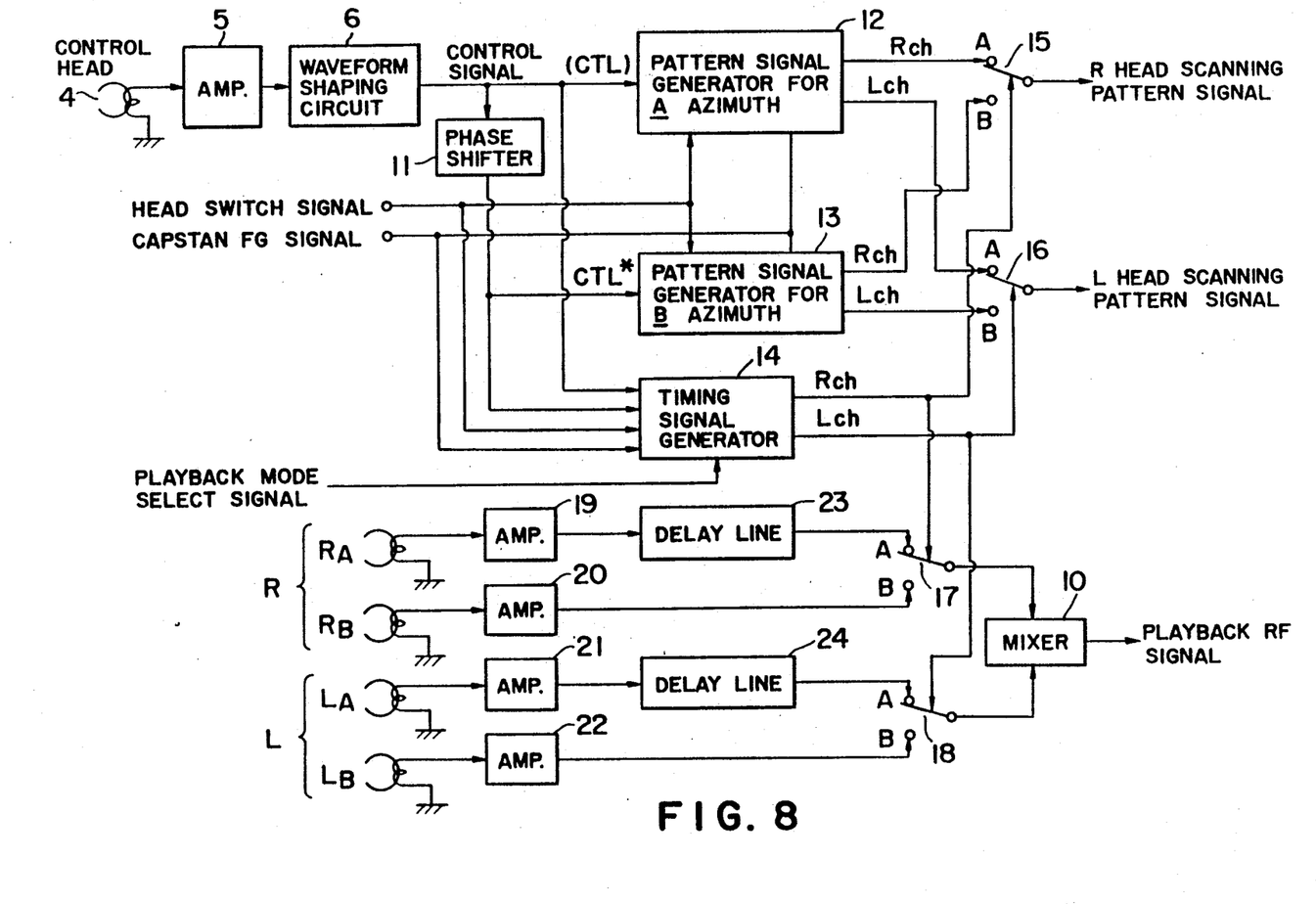
FIG. 8 is a block diagram of a circuit for tracking control of the head in the playback apparatus according to the first embodiment shown in FIG. 7.

FIG. 8 is a block diagram showing the circuit configuration for tracking control of those heads in an embodiment of a magnetic playback apparatus according to this invention.

In the figure, a signal reproduced by a control head 4 is amplified through an amplifier 5 and a waveform smoothing circuit 6 and is subjected to waveform shaping. The signal thus obtained is delivered to a pattern signal generator 12 for A azimuth (heads) and a timing signal generator 14, and is delivered to a phase-shifter 11.

Figure 9:
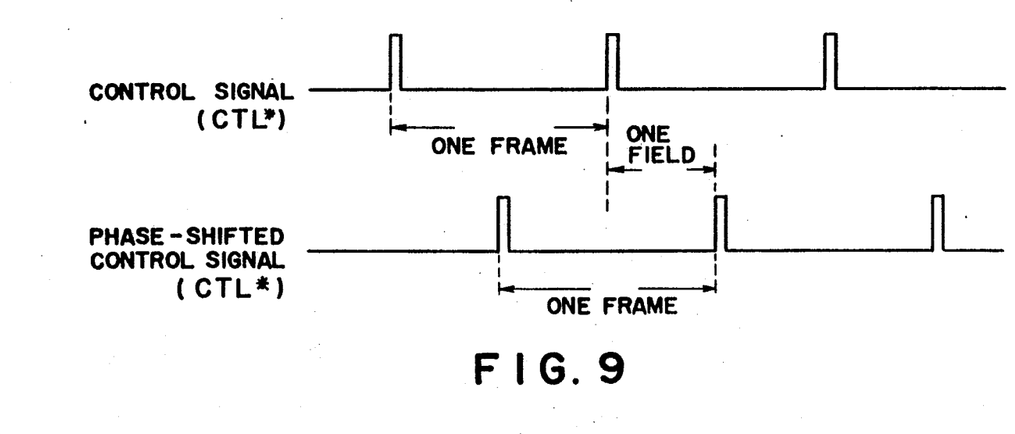
FIG. 9 is a waveform diagram for explaining the operation of a phase-shifter constituting the playback apparatus according to the first embodiment shown in FIG. 7.

As shown in FIG. 9, the phase-shifter 11 shifts a phase of a control signal CTL by an angle of 180 degrees and outputs it as a phase-shifted control signal CTL*. This control signal CTL* is delivered to a pattern signal generator 13 for B azimuth (heads) and a timing signal generator 14.

Furthermore, a head switching signal and a capstan FG signal respectively switched for every field is delivered to the pattern signal generator 12 for A azimuth, the pattern signal generator 13 for B azimuth, and the timing signal generator 14.

The pattern signal generator 12 for A azimuth responds to a control signal CTL, a head switching signal, and a capstan FG signal, and generates an A azimuth R head [$R_A$] scanning pattern signal (Rch) and an A azimuth L head [$L_A$] scanning pattern signal (Lch) as drive signals of the head displacement means 3 for controlling the tracking (vertical displacement) of rotary heads $R_A$ and $L_A$ of A azimuth, to thus deliver them to one input terminal A side) of the changeover switches 15 and 16, respectively.

Moreover, the pattern signal generator 13 for B azimuth responds to a phase-shifted control signal CTL*, a head switching signal, and a capstan FG signal which are delivered thereto to generate a B azimuth R head [$R_B$] scanning pattern signal (Rch) and a B azimuth L [$L_B$] scanning pattern signal (Lch) for rotary heads $R_B$ and $L_B$ of B azimuth in a manner similar to the above to deliver them to the other input terminal (B side) of the changeover switches 15 and 16, respectively.

Furthermore, the timing signal generator 14 responds to a control signal CTL, a phase-shifted control signal CTL*, a head switching signal, a capstan FG signal, and a playback mode select signal which are delivered thereto to generate timing signals for switching changeover switches 15 and 16 and changeover switches 17 and 18 which will be described later.

Figure 10:
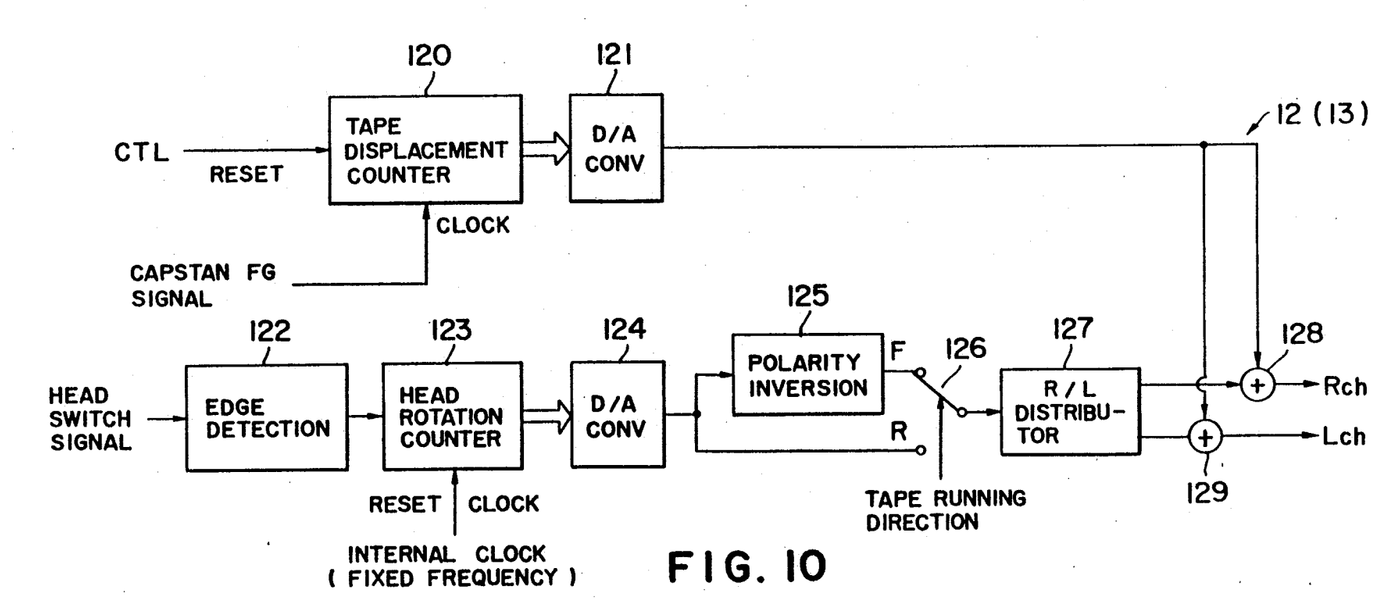
FIG. 10 is a block diagram showing the arrangement of a pattern signal generator in the apparatus of this invention.
Figure 11:
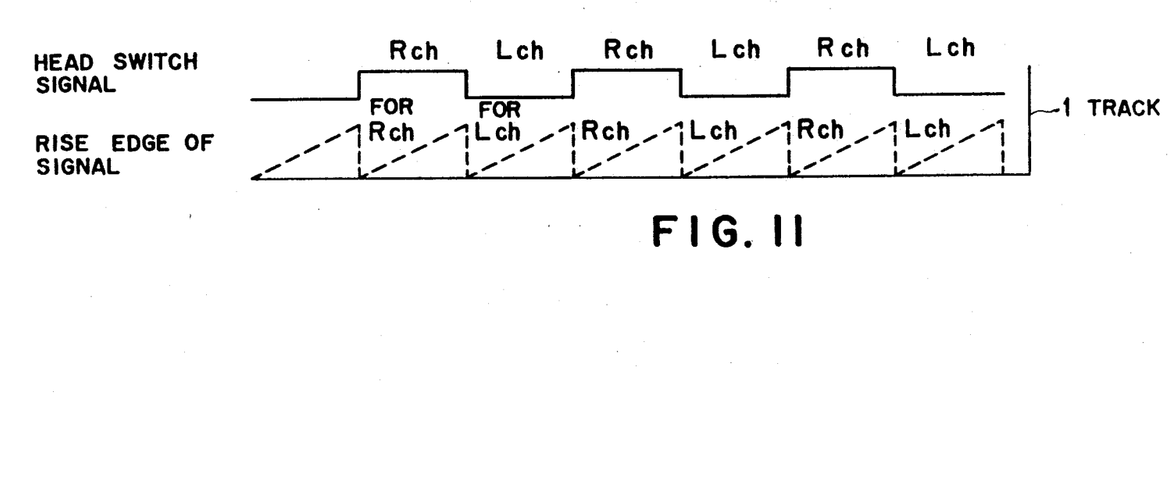
FIG. 11 is a waveform diagram for explaining the operation of the pattern signal generator shown in FIG. 10.

The above-mentioned pattern signal generator 12 or 13 is composed of, as shown in FIG. 10, a tape displacement counter 120, a digital/analog (D/A) converter 121, an edge detector 122, a head rotation counter 123, a D/A converter 124, a polarity inversion circuit 125, a forward and reverse changeover switch 126, a left and right channel distributor 127, and adders 128 and 129.

In the pattern signal generator 12 (13) constructed above, the head displacement pattern for controlling the head position to be on-track at the time of the special playback is utilized as a resultant vector of the relative positional displacements:

(a) Relative positional displacements between the tracks and the heads due to the running of the magnetic tape;

(b) Relative positional displacements between the tracks and the heads due to the rotation of the heads.

The displacement according to the item (a) is obtained by counting capstan FG signals indicative of a tape movement quantity refered to control (CTL) signal which is indicative of the tape position. This relationship is indicated by the broken lines in FIGS. 6 and 12.

On the other hand, since the displacement by the rotation of the head according to the item (b) can be considered constant irrespective of the running speed of the tape which is much slower than the head speed, this displacement is provided by counting predetermined clocks comtemplating the rise and fall edges of the head switch signal as respective references.

When the tape running direction is the forward direction same as the general scanning direction of the heads, the difference component between the above items (a) and (b) results a head scanning pattern, while when the tape running direction is the reverse direction, and additive component thereof results a head scanning pattern.

Figure 12:
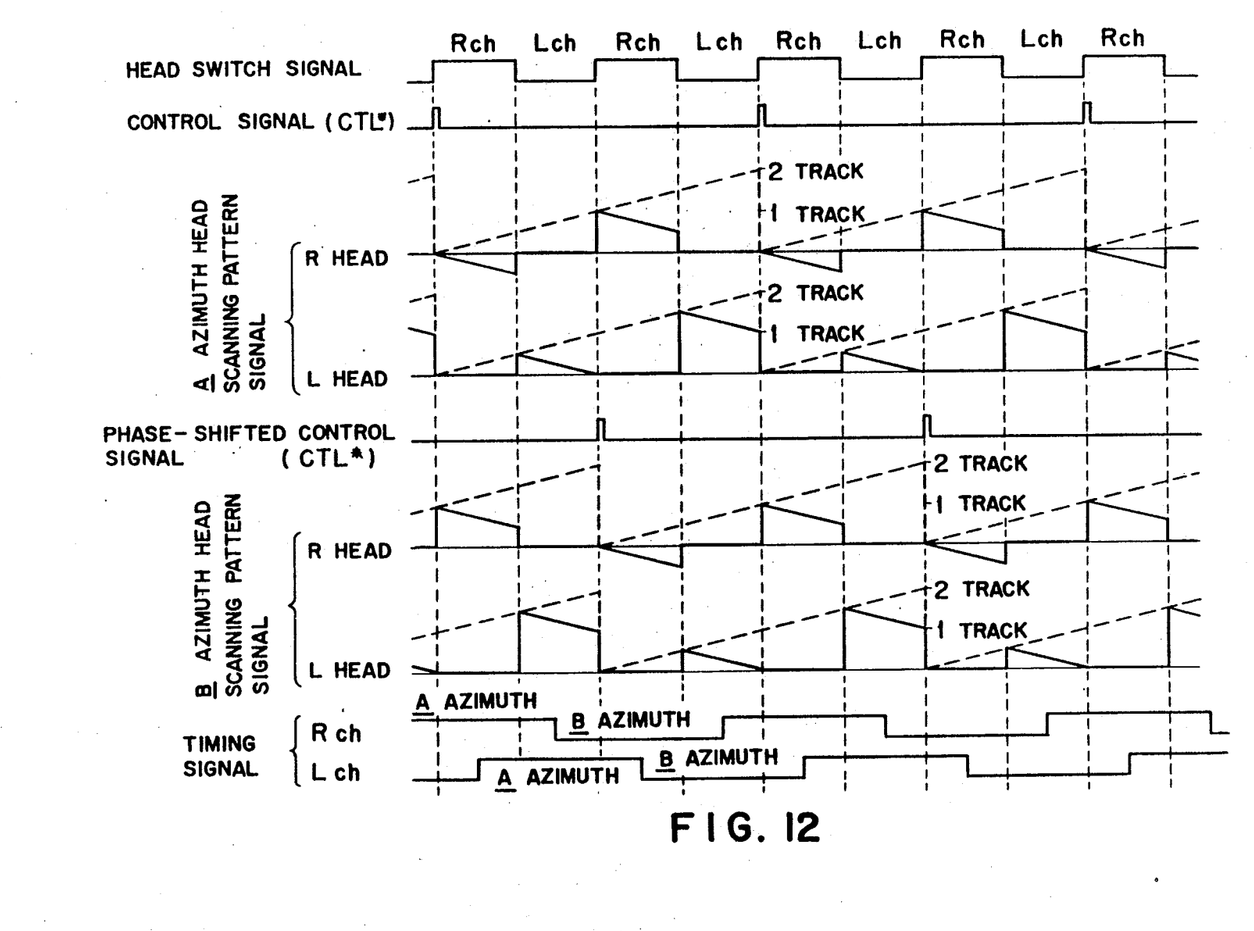
FIG. 12 is a waveform diagram showing respective signals at the time of carrying out a ½ speed playback by the apparatus according to the first embodiment.

As stated above, a head scanning pattern indicated by the solid line in FIGS. 3, 6 and 12 is produced. Assuming now that the pattern resulted from the CTL signal is used for the A azimuth, the pattern for B azimuth is derived from the CTL* signal of 180 degrees phase-shifted utilized by the same circuit construction.

From the changeover switch 15, a switched one of the A azimuth R head [$R_A$] scanning pattern signal (Rch) and the B azimuth R head [$R_B$] scanning pattern signal (Rch) is outputted. Furthermore, from the changeover switch 16, a switched one of the A azimuth L head [$L_A$] scanning pattern signal (Lch) and the B azimuth L head [$L_B$] scanning pattern signal (Lch) is outputted.

On the other hand, signals played back or reproduced by rotary heads $R_A$, $R_B$, $L_A$ and $L_B$ are amplified by amplifiers 19 to 22, respectively.

An output from the amplifier 19 is subjected to time delay for adjusting a time difference (e.g., two horizontal scanning intervals) corresponding to a distance between a pair of heads $R_A$ and $R_B$ disposed adjacent to each other by the delay line 23, and is then delivered to one input terminal (A side) of the changeover switch 17. Namely, the timing of a playback signal of the preceding head $R_A$ is caused to be adjusted to the timing of a playback signal of the succeeding head $R_B$ of the pair.

An output from the amplifier 20 is delivered to another input terminal (B side) of the changeover switch 17.

An output from the amplifier 21 is subjected to a time delay for adjusting a time difference (e.g., two horizontal scanning intervals) corresponding to a distance between the gaps of a pair of heads $L_A$ and $L_B$ disposed adjacent each other by the delay line 24 in the manner similar to the above, and is then delivered to one input terminal (A side) of the changeover switch 18. Namely, in the manner similar to the above, the timing of a playback signal of the preceding heads $L_A$ is caused to be adjusted to the timing of the playback signal of the head $L_B$ of the pair disposed adjacent thereto.

An output from the amplifier 22 is delivered to another input signal (B side) of the changeover switch 18.

Outputs from the changeover switches 17 and 18 are combined by a mixer 10. The signal thus obtained is outputted as a playback RF signal.

FIG. 12 is a diagrammatic view showing respective signals in the case of conducting an ½ tape speed playback. In this case, the control signal CTL and the phase-shifted control signal CTL. have two frame periods, respectively. There are shown an A azimuth R head [$R_A$] scanning pattern signal and A azimuth L head [$L_A$] scanning pattern signal for the head $R_A$ and $L_A$. There are further shown a B azimuth R head [$R_B$] scanning pattern signal and a B azimuth L head [$L_B$] scanning pattern signal for heads $R_B$ and $L_B$. Furthermore, the sawtooth waveform indicated by the broken line represents a relative positional displacement of tracks and heads due to the running of the magnetic tape.

Figure 13:
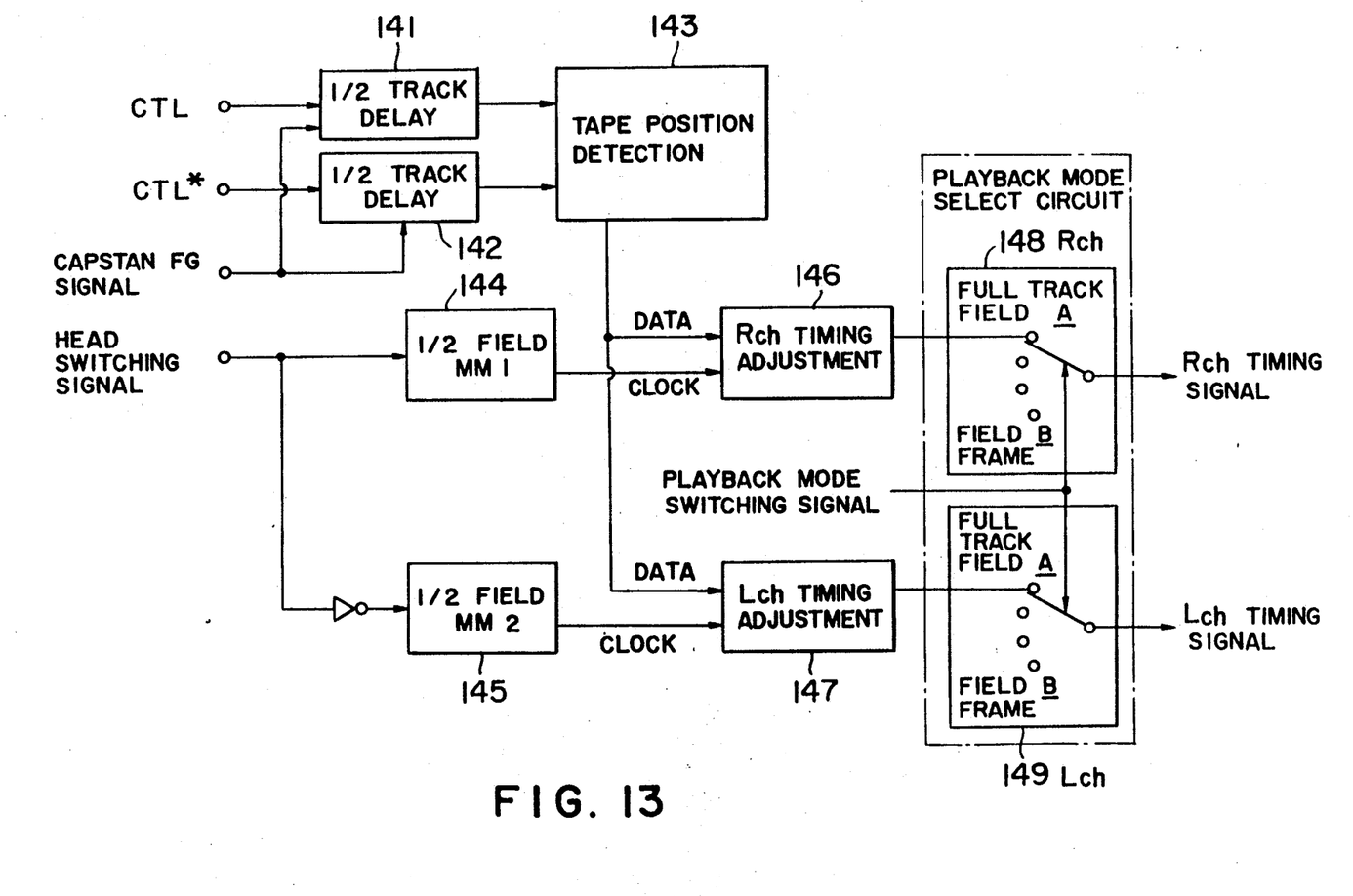
FIG. 13 is a block diagram showing an arrangement of a timing signal generator in the apparatus according to the first embodiment.

The configuration of the timing signal generator 14 will be described with reference to FIG. 13. This timing signal generator 14 is composed of ½ track delay circuits 141 and 142, a tape position detection circuit 143, first and second ½ field monomultivibrators (MM1, MM2) 144 and 145, R-channel and L-channel timing adjustment circuits 146 and 147, and R-channel and L-channel playback mode selection circuits 148 and 149.

Figure 14:
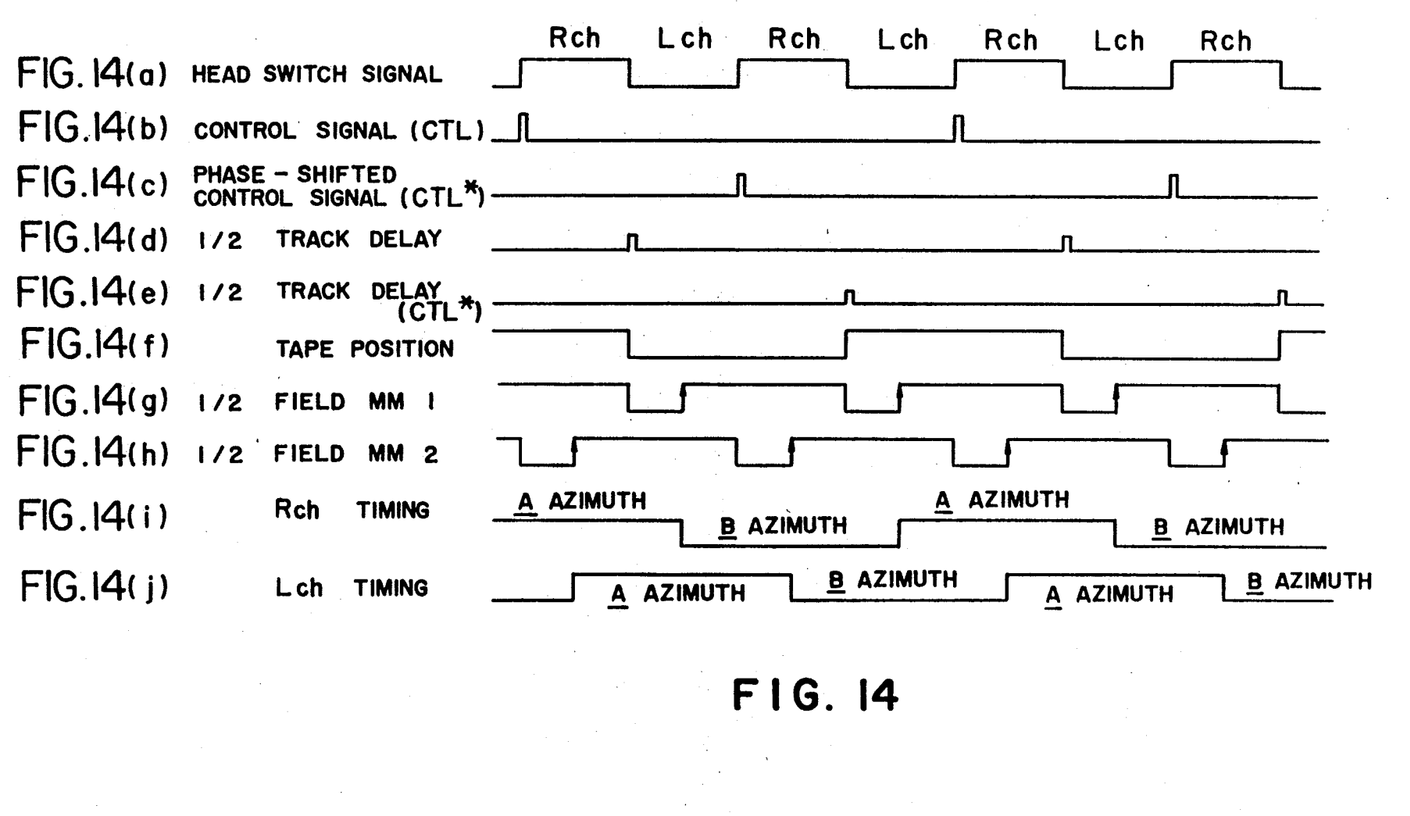
FIGS. 14(a)–14(j) are waveform diagrams for explaining the operation of the timing signal generator shown in FIG. 13.

The operation of the timing signal generator 14 will be described in accordance with the timing chart of FIG. 14.

The timing signal generator 14 is a block for generating control signals in response to the head switching signal shown as FIG. 14(a) for operating switches 15 to 18 which select proper heads and selectively supply proper scanning pattern signal to head displacement devices therefore.

As an example, the operation of the time of the ½ tape speed (slow motion) playback will be described.

Initially, in order to allow the track scanning by R and L heads to be conducted in the order of 1A, 1A, 1B, 1B, 2A, 2A, 2B, 2B, and so on, a current tape position is detected by being refered to the reproduced control signals. In this example, in order that A azimuth playback is conducted in the range of ±½ track of the track corresponding to the reproduced CTL signal pulse, and B azimuth playback is conducted in the range of ±½ track of the track corresponding to the reproduced CTL* signal pulse, the interval between control signal (CTL or CTL*) pulses are divided with the capstan FG signal pulses to provide tape positional information (FIG. 14(f)). As shown in FIGS. 14(b) to 14(e), the control signals CTL and CTL* are delayed by ½ track delay circuits 141 and 142 using the capstan FG signal pulses as a clock. As a result, the high level period and the low level period of a tape positional signal respectively correspond to the ±½ track range of the CTL pulse and the ±½ track range of the CTL* pulse as shown in FIGS. 14(c), 14(d) and 14(f).

Then, in order to carry out A to B or B to A azimuth switching of the timing signal when signals on the magnetic tape are not read out the ½ Field MM1 144 and 145 are operated so that the rise of the ½ Field MM1 and MM2 signals, the azimuth switchings are performed as shown in FIGS. 14(g) to 14(j). By latching the above-described tape positional signal at these azimuth switching timings, the playback azimuths of R head and L head can be determined, respectively.

The operation for scanning all the tracks at, the ½ tape speed slow motion playback without causing sequential irregularities has been described. By switching the playback mode select switch, any one of the field playback (A azimuth playback), the field playback (B azimuth playback), and the frame playback can be selected.

The timing signal is a signal for switching respective switches so that, at the time of "High" level, the A azimuth head scanning pattern signals are outputted from the changeover switches 15 and 16 and playback signals of the A azimuth head are outputted from the changeover switches 17 and 18, respectively, and, at the time of "Low" level, the B azimuth head scanning pattern signals are outputted from the changeover switches 15 and 16, and playback signals of the B azimuth head are outputted from the changeover switches 17 and 18, respectively. Furthermore, the timing for switching between the changeover switches 15 and 17 in regard to the R head and the timing for switching between the changeover switches 16 and 18 in regard to the L head are shifted each other by a phase angle of 90 degrees.

It is to be noted that switching by the timing signal is conducted when the heads do not reproduce signals on the magnetic tape so that the reproduced picture is not disturbed at the time of switching.

Accordingly, the changeover switches 15 to 18 are switched to the A side to output an A azimuth head scanning pattern signal to control tracking positions of the heads $R_A$ and $L_A$ of A azimuth, to thus provide reproduced signals of the A azimuth head. On the other hand, the changeover switches 15 to 18 are switched to the B side to output a B azimuth head scanning pattern signal to control tracking positions of the heads $R_B$ and $L_B$ of B azimuth, to thus provide playback signals of the B azimuth head.

½ tape speed playback

In the case of carrying out the ½ tape speed playback, the changeover switches 15 to 18 are first switched to the A side to scan the track 1A by means of the heads $R_A$ and $L_A$ of A azimuth to produce playback signals of A azimuth head to combine them into a picture of one frame. Then, the changeover switches 15 to 18 are switched to the B side to trace the track 1B by means of the heads $R_B$ and $L_B$ of B azimuth to produce playback signals of B azimuth head to combine them into a picture of one frame. In the manner similar to the above, the changeover switches 15 to 18 are switched to the A side or B side to sequentially scan tracks 2A, 2B, 3A, 3B with the heads of corresponding A and B azimuths, to thus produce playback signals from A and B tracks. Namely, playback is conducted in the order of 1A, 1A, 1B, 1B, 2A, 2A, 2B, 2B, 3A, 3A, 3B, 3B and so on. Thus, a smooth picture reproduction is performed.

The above-described playback process is applicable to forward ½ to backward ½ tape speed reproduction. At the time of a tape speed at less than ½ standard speed, the same tracks are repeatedly scanned several times depending on the desired tape speed. At the time of still picture playback, the nearest trackable track is repeatedly scanned. In the case of a quick motion playback at more than ½ standard speed, the magnetic tape advances by a distance corresponding to more than one field during one revolution of the rotary drum, which does not allow the heads to scan the A and B tracks completely. For this reason, switching is conducted to the field playback on either A or B tracks.

Frame playback

Figure 17:
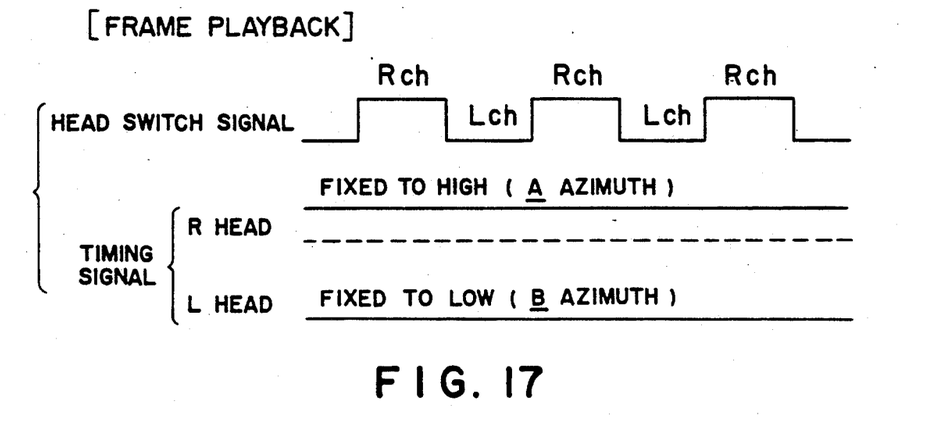
FIG. 17 is a waveform diagram for explaining the operation in the case of carrying out a frame playback in a still playback by the playback apparatus of the first embodiment.

Furthermore, in case of ½ tape speed playback, instead of conducting a field playback of the A and B tracks by turns, another playback mode is possible i.e. one of the timing signals is fixed to "High" level for the R head and another to be fixed to "Low" level for the L head as shown in FIG. 17. Thus, the changeover switches 15 and 17 are switched to the A side at all times, and the changeover switches 16 and 18 are switched to the B side at all times. The head $R_A$ of A azimuth scans tracks of the A and plays them back. On the other hand, the head $L_B$ of B azimuth scans tracks of the B and plays them back. Namely, playback is conducted in the order of 1A, 1B, 1A, 1B, 2A, 2B, 2A, 2B, 3A, 3B, 3A, 3B and so on. Thus, playback signals of two fields are combined to produce into a picture of one frame.

When the frame playback is carried out in this manner, vibrational movements or fluctuations of picture may occur rather than improvement of the picture quality. Thus, such a playback process is preferable to a playback of an image of slow moving object. When there is a need to carry out a playback of an image of a high-speed moving object, it is recommended to switch the playback more to the field playback in Order to prevent such picture fluctuations.

It is to be noted that switching between the frame playback and the field playback may be conducted by providing a manual changeover switch or an automatic switch operated in correspondence with changes (movements) of an image.

In order to carry out the frame playback as stated above, the switching of the heads is changed from combination of "AA" to "AB", and further the head scanning pattern signal for controlling tracking positions of the heads on the L side is changed to such a head scanning pattern signal that the scanning track is shifted by one track to the B tracks.

With such an approach as switching the playback mode to the frame playback in the case of an image of a slow moving object as a still picture playback or a slow motion playback, a clear pictorial image is obtained.

It is to be noted that, in the case of the above-mentioned ½ speed playback, an approach may be employed to switch the changeover switches 15 to 18 to the A side at all times to allow heads $R_A$ and $L_A$ of A azimuth to respectively scan twice each of the A tracks to play them back. Namely, playback is conducted in the order of 1A, 1A, 1A, 1A, 2A, 2A, 2A, 2A, 3A, 3A, 3A, 3A, and so on. Thus, playback signals of two fields are combined into a picture of one frame.

Furthermore, a different approach may be employed to fix a timing signal to "Low" level in the ½ speed playback to switch the changeover switches 15 to 18 to the B side at all times to allow the heads $R_B$ and $L_B$ of B azimuth to repeatedly scan twice each of the B tracks to play them back. Namely, playback is conducted in the order of 1B, 1B, 1B, 1B, 2B, 2B, 2B, 2B, 3B, 3B, 3B, 3B and so on. Thus, playback signals of two fields are combined into a picture of one frame.

Figure 15:
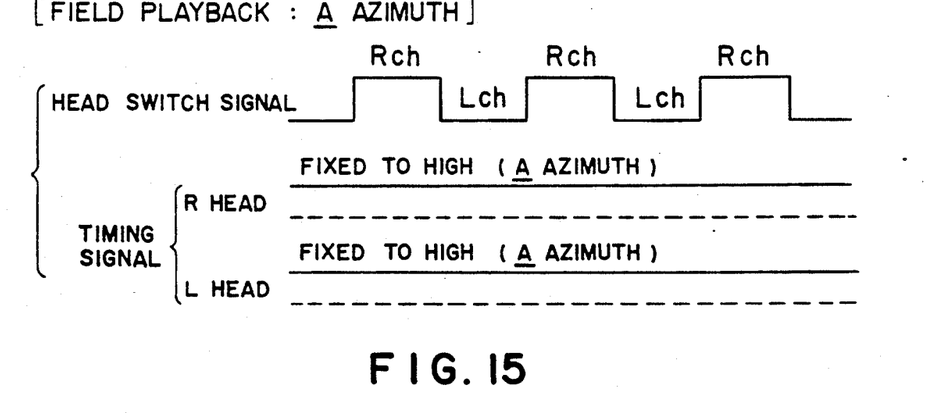
FIG. 15 is a waveform diagram for explaining the operation in the case of carrying out a field playback of A azimuth in a still playback by the playback apparatus of the first embodiment.
Figure 16:
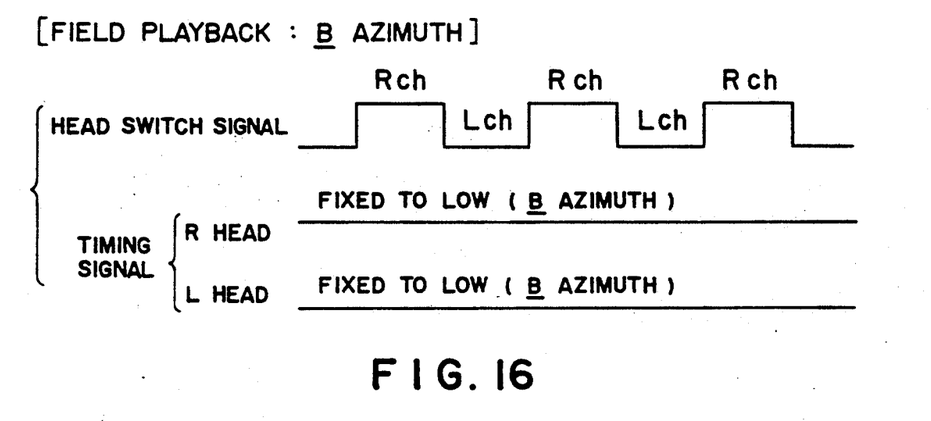
FIG. 16 is a waveform diagram for explaining the operation in the case of carrying out a field playback of B azimuth in a still playback by the playback apparatus of the first embodiment.

Still picture playback (1) In the case of carrying out a field playback by A azimuth heads in a still picture playback mode, an approach is preferably employed as shown in FIG. 15 to fix both of the timing signals to "High" level, thereby switching the changeover switches 15 to 18 to the A side at all times to allow the heads $R_A$ and $L_A$ of A azimuth to scan only the A tracks, to thus produce playback signals (field playback signal) of the A azimuth heads;

(2) in the case of carrying out a field playback by B azimuth heads in the still picture playback mode, an approach is preferably employed as shown in FIG. 16 to fix both of the timing signals to "Low" level to thereby switch the changeover switches 15 to 18 to the B side at all times to allow the heads $R_B$ and $L_B$ of B azimuth to scan only the B tracks, to thus produce playback signals (field playback signals) of the B azimuth heads; and (3) in the case of carrying out a frame playback in the still picture playback mode, an approach is preferably employed as shown in FIG. 17 to fix a timing signal for the R head to "High" level and to fix another timing signal for the L head to "Low" level, to thereby switch changeover switches 15 and 17 to the A side at all times and to switch the changeover switches 16 and 18 to the B side at all times to allow the head $R_A$ of A azimuth to scan the A tracks to thus produce playback signals (field playback signals) of the A azimuth head, and to allow the head $R_B$ of B azimuth to scan the B tracks to produce playback signals (field playback signals) of the B azimuth head, to thus combine those playback signals of the A and B azimuth heads into a picture of one frame.

By changing the timing signal as stated above, a desired azimuth playback (track scanning) can be conducted. This may be performed at any playback speed.

Other embodiments

A second embodiment of a magnetic playback apparatus according to the present invention will now be described.

Figure 18:
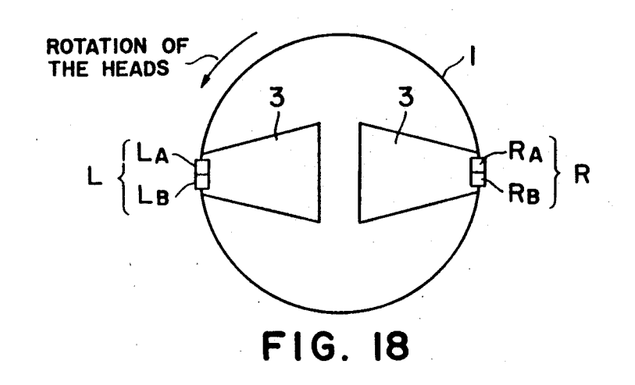
FIG. 18 is a plan view showing a head arrangement in a playback apparatus according to a second embodiment of this invention.

As shown in FIG. 18, arrangement of the heads $L_A$ and $L_B$ on the L side is reversed to the head arrangement of the first embodiment of FIG. 7 so that heads having different azimuth angles are arranged at positions opposite to each other across the center of rotation i.e., separated by an angular distance of 180 degrees. Thus, the heads are allowed to scan tracks of a magnetic tape in the order of $R_A$, $R_B$, $L_B$ and $L_A$.

Figure 19:
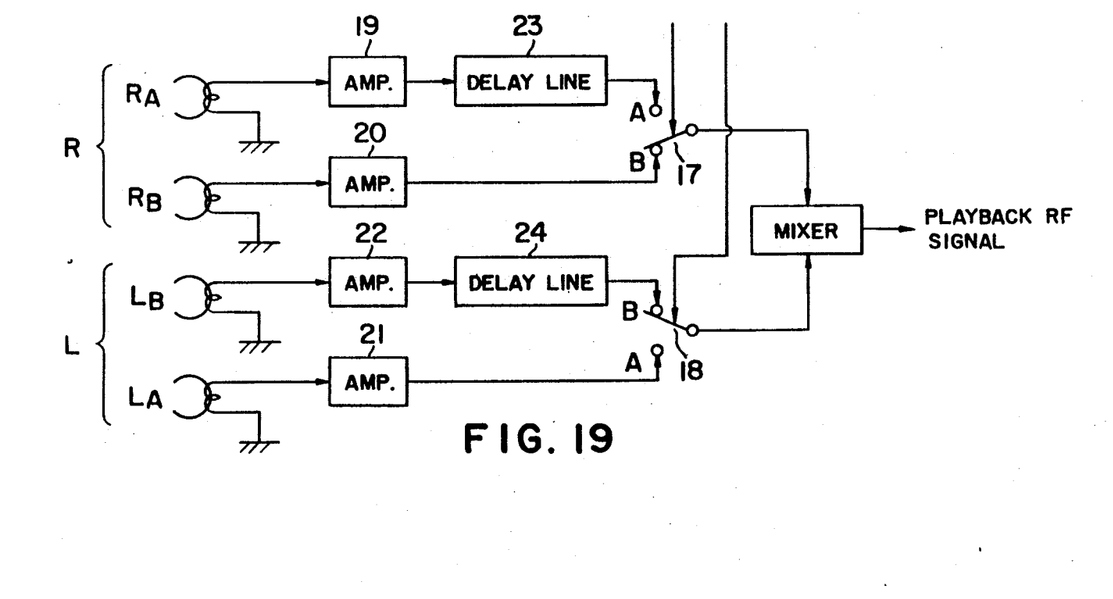
FIG. 19 is a block diagram showing the essential part of a circuit configuration for tracking control of the head in the playback apparatus according to the second embodiment shown in FIG. 18.

FIG. 19 is a block diagram showing a portion (the portion principally different from the configuration of FIG. 8) for tracking control of heads in the second embodiment shown in FIG. 8.

The circuit of FIG. 19 differs from the circuit of the first embodiment shown in FIG. 8 only in the circuit configuration of the head section.

In FIG. 19, signals played back or reproduced by heads $L_B$ and $L_A$ are amplified by amplifiers 22 and 21, respectively. In this case, an output from the amplifier for amplifying a playback signal from the preceding head $L_B$ is subjected to a time delay by the delay line 24 for adjusting a time difference (e.g., two horizontal scanning periods) corresponding to a distance between gaps of the pair of heads $L_A$ and $L_B$ disposed adjacent to each other, and is then delivered to One input terminal B side) of the changeover switch 18. Namely, the timing of a playback signal of the preceding head $L_B$ is aligned with the timing of a playback signal of the head $L_A$ of the pair.

On the other hand, an output from the amplifier 21 for amplifying a playback signal of the head $L_A$ is delivered to the other input terminal (A side) of the changeover switch 18. As stated above, the circuit according to the second embodiment of FIG. 19 differs from the circuit of the first embodiment of FIG. 18 only in the insertion position of the delay line 24 and switching between A and B azimuths of the heads on the L side.

In the head arrangement of the first embodiment of FIG 7, heads having the same azimuth angle are arranged at positions opposite to each other by an angular distance of 180 degrees on the rotary drum Because of this, such arrangement is desirable for a field playback and is used exclusively for playback. However, in the head arrangement of the second embodiment of FIG. 18, heads having different azimuth angles are arranged at positions opposite to each other by an angular distance of 180 degrees on the rotary drum 1. Thus, such a head arrangement is applicable to recording (special mode recording operations).

In the head arrangement of the second embodiment of FIG. 18, the pair of heads at each side have different azimuth angles each other. On the contrary, the pair of heads at each side in the first embodiment of FIG. 7, has the same azimuth angles each other. As far as the productivity of the heads is concerned, the latter head arrangement is advantageous.

What is claimed is:

1. A Playback apparatus for playing back information signals prerecorded on a magnetic tape along tracks inclined with respect to a longitudinal direction of said magnetic tape in a manner such that tracks of common azimuth angle are formed on every track, said apparatus comprising:

a first head assembly comprising a first head for scanning tracks of a first azimuth and a second head for scanning tracks of a second azimuth, said first head assembly being movably arranged in a direction perpendicular to a track scanning direction;

a second head assembly comprising a third head for scanning tracks of said first azimuth and a fourth head for scanning tracks of said second azimuth, said second head assembly being arranged movably in a direction perpendicular to a track scanning direction;

a rotary drum for carrying said first and second head assemblies and winding said magnetic tape at a predetermined angular range;

first displacement means for supporting and displacing said first head assembly in accordance with a selected tape speed mode, and for causing each of the heads in the first head assembly to scan said tracks having azimuth angles common to azimuth angles of said heads, when a recorded image signal on said tape is played back from said magnetic tape; and second displacement means for supporting and displacing said second head assembly in accordance with a selected tap speed mode, said second displacement means being disposed 180 degrees angularly opposite to said first displacement means and for causing each of the heads in the second head assembly to scan said tracks having azimuth angles common to azimuth angles of said heads, when a recorded image signal on said magnetic tap is played back from said magnetic tape:

wherein said first to fourth heads are arranged on an outer circumference of said rotary drum in the order of the first, second, third and fourth heads: and wherein control means is provided for controlling displacement of said first and second head assemblies, and said control means comprises:

a waveform shaping circuit for shaping a waveform of a control signal recorded along said magnetic tape and picked up by a control head, a phase-shifter for phase-shifting said control signal by a phase angle of 180 degrees to generate a phase-shifted control signal, first pattern generating means for generating a first head scanning pattern signal for controlling the first and third heads and which drives said first and second displacement means in response to said control signal for tracking said tracks of said first azimuth, second pattern signal generating means for generating a second head scanning pattern signal for controlling the second and fourth heads which drives said first and second displacement means in response to said phase-shifted control signal for tracking said tracks of said second azimuth, switching means for switching playback signals from said first head and said second head of said first head assembly, so that output from only one of said first and second heads is used at one time and for switching playback signals from said third head and said fourth head of said second head assembly, so that output from only one of said third and fourth heads is used at one time in order to produce a video signal corresponding to said selected tape speed mode.

2. The apparatus according to claim 1, and further comprising:

additional switching means for selecting output signals from said first and second pattern signal generating means to produce a first pattern signal for displacing said first head assembly by said displacement means and a second pattern signal for displacing said second head assembly.

3. A playback apparatus for playing back information signals prerecorded on a magnetic tap along tracks inclined with respect to a longitudinal direction of said magnetic tape in a manner such that tracks of common azimuth angle are formed on every track, said apparatus comprising:

a first head assembly comprising a first head for scanning tracks of a first azimuth and a second head for scanning tracks of a second azimuth, said first head assembly being movably arranged in a direction perpendicular to a track scanning direction;

a second head assembly comprising a third head for scanning tracks of said first azimuth and a fourth head for scanning tracks of said second azimuth, said second head assembly being arranged movably in a direction perpendicular to a track scanning direction;

a rotary drum for carrying said first and second head assemblies and winding said magnetic tape at a predetermined angular range;

first displacement means for supporting and displacing said first head assembly in accordance with a selected tap speed mode, and for causing each of the heads in the first head assembly to scan said tracks having azimuth angles common to azimuth angles of said heads, when a recorded image signal on said tape is played back from said magnetic tape; and second displacement means for supporting and displacing said second head assembly in accordance with a selected tape speed mode, said second displacement means being disposed 180 degrees angularly opposite to said first displacement means and for causing each of the heads in the second head assembly to scan said tracks having azimuth angles common to azimuth angles of said heads, when a recorded image signal on said magnetic tape is played back from said magnetic tape:

wherein said first to fourth heads are arranged on an outer circumference of said rotary drum in the order of said first, second, fourth and third heads: and wherein control means is provided for controlling displacement of said first and second head assemblies, and said control means comprises;

a waveform shaping circuit for shaping a waveform of a control signal recorded along said magnetic tape and picked up by a control head, a phase-shifter for phase-shifting said control signal by a phase angle of 180 degrees to generate a phase-shifted control signal, first pattern generating means for generating a first head scanning pattern signal for controlling the first and third heads and which drives said first and second displacement means in response to said control signal for tracking said tracks of said first azimuth, second pattern signal generating means for generating a second head scanning pattern signal for controlling the second and fourth heads which drives said first and second displacement means in response to said phase-shifted control signal for tracking said tracks of said second azimuth, switching means for switching playback signals from said first head and said second head of said first head assembly, so that output from only one of said first and second heads is used at one time and for switching playback signals from said third head and said fourth head of said second head assembly, so that output from only one of said third and fourth heads is used at one time in order to produce a video signal corresponding to said selected tape speed mode.

4. The apparatus according to claim 3, and further comprising:

additional switching means for selecting output signals from said first and second pattern signal generating means to produce a first pattern signal for displacing said first head assembly by said displacement means and a second pattern signal for displacing said second head assembly.

* * * * *